United States Patent
Liu et al.

(10) Patent No.: US 9,329,941 B2
(45) Date of Patent: *May 3, 2016

(54) SYSTEM AND METHOD FOR VIRTUALIZING BACKUP IMAGES

(71) Applicant: Catalogic Software, Inc., Woodcliff Lake, NJ (US)

(72) Inventors: Peter Chi-Hsiung Liu, Paramus, NJ (US); Soubir Acharya, Pleasantville, NY (US)

(73) Assignee: CATALOGIC SOFTWARE, INC., Woodcliff Lake, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,224

(22) Filed: Nov. 29, 2012

(65) Prior Publication Data

US 2013/0086347 A1    Apr. 4, 2013

Related U.S. Application Data

(63) Continuation of application No. 11/993,643, filed as application No. PCT/US2006/024479 on Jun. 23, 2006, now Pat. No. 8,346,726.

(60) Provisional application No. 60/693,715, filed on Jun. 24, 2005.

(51) Int. Cl.
*G06F 17/30* (2006.01)
*G06F 11/14* (2006.01)
(Continued)

(52) U.S. Cl.
CPC .......... *G06F 11/1451* (2013.01); *G06F 3/0482* (2013.01); *G06F 11/1453* (2013.01);
(Continued)

(58) Field of Classification Search
CPC .............. G06F 3/0482; G06F 11/1469; G06F 11/2074; G06F 11/1456; G06F 12/16; G06F 11/1451; G06F 11/1453; G06F 2201/84; G06F 9/5077; G06F 9/45558; G06F 9/50; G06F 9/45533; G06F 9/455; G06F 11/1458
USPC .......... 707/640, 999.204, 649, 781, 782, 784, 707/610, E17.032, E17.005; 718/1, 100, 718/102, 104; 711/162, 1, 114, 111, 112, 711/203, 6, 147, 161, 100; 714/6, 9, 5, 11; 709/206, 203, 207, 208, 223, 213, 226, 709/218, 219

See application file for complete search history.

(56) References Cited

U.S. PATENT DOCUMENTS

| 4,588,479 A | * | 5/1986 | Weber et al. | 202/228 |
| 5,018,078 A | * | 5/1991 | Urabe et al. | 345/561 |

(Continued)

FOREIGN PATENT DOCUMENTS

WO    9309494    5/1993

OTHER PUBLICATIONS

Marrón, P.J.; Inst. fur Inf., Freiburg Univ., Germany—"Design of a middleware service for scalable wide area network applications"—Published in: Distributed Objects and Applications, 2000. Proceedings. DOA '00. International Symposium on Date of Conference: 2000 pp. 263-272 Meeting Date: Sep. 21-23, 2000.*

(Continued)

*Primary Examiner* — Anh Ly
(74) *Attorney, Agent, or Firm* — Erik Huestis; Foley Hoag LLP

(57) ABSTRACT

Facility for using images created by backup software to recreate an entire machine as it was at the point in time in the past when the backup was taken. The facility can be extended so as to bring up a set of machines which together serve some logical business function as in a cluster or federated servers, and further extended so that an entire data center may be virtualized from backup images. The virtualized servers provided may serve as an alternate data center standing in case of disaster or to meet maintenance windows achieving low cost Instant Disaster Recovery. A set of virtual machines may stand in for physical machines for a period of time and then resynchronized or re-seeded to physical machines via a combination of bare metal recovery and re-synchronizing from live LUNs that form the virtual machine disks.

4 Claims, 1 Drawing Sheet

(51) Int. Cl.
*G06F 3/0482* (2013.01)
*G06F 12/16* (2006.01)
*G06F 11/20* (2006.01)

(52) U.S. Cl.
CPC ........ *G06F11/1456* (2013.01); *G06F 11/1469* (2013.01); *G06F 12/16* (2013.01); *G06F 11/2074* (2013.01); *G06F 2201/84* (2013.01)

(56) References Cited

U.S. PATENT DOCUMENTS

| | | | |
|---|---|---|---|
| 5,018,097 A * | 5/1991 | Kuhlmann et al. | 719/313 |
| 5,047,923 A * | 9/1991 | Elstner et al. | 718/107 |
| 5,086,497 A * | 2/1992 | Horikawa et al. | 715/209 |
| 5,155,837 A * | 10/1992 | Liu et al. | 709/221 |
| 5,163,122 A * | 11/1992 | Urabe et al. | 358/1.9 |
| 5,231,636 A * | 7/1993 | Rasmussen | 327/387 |
| 5,325,520 A * | 6/1994 | Nguyen et al. | 714/17 |
| 5,410,621 A * | 4/1995 | Hyatt | 382/260 |
| 5,488,716 A | 1/1996 | Schneider et al. | |
| 6,016,553 A * | 1/2000 | Schneider et al. | 714/21 |
| 6,101,327 A * | 8/2000 | Holte-Rost et al. | 717/170 |
| 6,289,356 B1 * | 9/2001 | Hitz et al. | 711/162 |
| 6,615,365 B1 | 9/2003 | Jenevein et al. | |
| 6,795,966 B1 | 9/2004 | Lim et al. | |
| 6,931,558 B1 | 8/2005 | Jeffe et al. | |
| 7,093,086 B1 | 8/2006 | Rietschote | |
| 7,191,299 B1 | 3/2007 | Kekre | |
| 7,254,682 B1 | 8/2007 | Arbon | |
| 7,266,655 B1 | 9/2007 | Escabi et al. | |
| 7,313,614 B2 * | 12/2007 | Considine et al. | 709/223 |
| 7,322,010 B1 | 1/2008 | Mikula | |
| 7,356,679 B1 * | 4/2008 | Le et al. | 713/1 |
| 7,529,897 B1 * | 5/2009 | Waldspurger et al. | 711/162 |
| 7,565,517 B1 | 7/2009 | Arbon | |
| 7,937,547 B2 * | 5/2011 | Liu et al. | 711/162 |
| 8,195,443 B2 * | 6/2012 | Malloy et al. | 703/17 |
| 8,255,651 B2 * | 8/2012 | Liu et al. | 711/162 |
| 2002/0049883 A1 * | 4/2002 | Schneider et al. | 711/100 |
| 2002/0069369 A1 | 6/2002 | Tremain | |
| 2003/0126202 A1 | 7/2003 | Watt | |
| 2003/0191911 A1 * | 10/2003 | Kleinschnitz et al. | 711/154 |
| 2004/0052397 A1 * | 3/2004 | Aronson et al. | 381/397 |
| 2004/0172574 A1 | 9/2004 | Wing et al. | |
| 2005/0052397 A1 * | 3/2005 | Chida | 345/99 |
| 2005/0055603 A1 | 3/2005 | Soran et al. | |
| 2006/0085792 A1 * | 4/2006 | Traut | 718/100 |
| 2009/0222496 A1 * | 9/2009 | Liu et al. | 718/1 |
| 2011/0251992 A1 * | 10/2011 | Bethlehem et al. | 707/781 |
| 2014/0317059 A1 * | 10/2014 | Lad et al. | 707/649 |

OTHER PUBLICATIONS

Venkatesan, S.; Dept. of Comput. Sci., Pittsburgh Univ., PA, USA—"Message-optimal incremental snapshots" Published in: Distributed Computing Systems, 1989., 9th International Conference on—Date of Conference: Jun. 5-9, 1989 pp. 53-60 Meeting Date : Jun. 5-9 1989.*

Newman, Wiberg & Braswell, Server Consolidation with VMware ESX Server, pp. 123-126, Jan. 11, 2005, http://www.redbooks.ibm.com/redpapers/pdfs/redp3939.pdf.

* cited by examiner

SYSTEM AND METHOD FOR VIRTUALIZING BACKUP IMAGES

CROSS-REFERENCE TO RELATED APPLICATIONS

This application is a continuation of U.S. application Ser. No. 11/993,643, filed Dec. 21, 2007, published as U.S. 2009/0222496, now U.S. Pat. No. 8,346,726, which is a national stage entry of PCT/US2006/024479, filed Jun. 23, 2006, which claims the benefit of the filing date of U.S. Provisional Application No. 60/693,715, filed on Jun. 24, 2005, all of which are incorporated herein by reference. This application also incorporates by reference the entire disclosure of our commonly invented and commonly assigned application entitled "System And Method for High Performance Enterprise Data Protection", application Ser. No. 11/993,634, filed Dec. 21, 2007, now U.S. Pat. No. 7,937,547.

BACKGROUND OF THE INVENTION

1. Field of the Invention

The present invention is in the field of information technology, and more particularly relates to high performance, enterprise-level backup and disaster recovery systems, and the use of virtualization technology in this field to provide additional advantages and benefits.

2. Description of Related Art

The state of the art in backup and disaster recovery technology is described in the references listed in the companion patent application referenced and incorporated by reference above.

Examples of systems providing virtualization services include, for example: VMWare (www.vmware.com); Microsoft Virtual Server (www.microsoft.com/windowsserversystem/virtualserver/default.mspx); and Xen— (www.xensource.com).

There has been some use in the prior art of virtualization technology in enterprise-level backup and disaster recovery operations.

For example, widely used virtualization servers, such as those cited above, all include the ability to create and save virtual machines by creating a new (empty) virtual machine "shell"; installing an operating system in a new virtual machine; installing applications into the new virtual system; and copying existing data for those applications for other virtual or real (i.e., physical) machines.

In addition, it is known to install backup client software on a virtual machine and to restore to the virtual machine a backup set, including the state of the processor and peripheral devices, created from a real machine. See Traut, U.S. Patent Publication No. US 2006/085792 A1 (Apr. 20, 2006). However, this is no different operationally than restoring to a real machine.

In addition, the virtualization software may provide the ability to import data from third-party backup formats. See "Importing Virtual Machines and System Images from Other Formats" (www.vmware.com/support/ws55/doc/ws_newguest_vm_importer.html). Again, this is fundamentally the same type of "import" operation as might be performed when importing a foreign backup format in restoring data to a real machine.

The prior art does not provide any process for backing up a real machine in such a manner that the entire machine may be recreated, from the backup image, as it existed at a specified point in time, in a virtualization environment, under a virtualization server.

SUMMARY OF THE INVENTION

It is an object of the present invention to provide a facility for using images created by backup software (or images created by other software reconstituted by Backup Software) to recreate an entire machine as it was at the point in time in the past when the backup was taken.

It is an additional object of the invention to extend such facility so as to bring up a set of machines which together serve some logical business function as in a cluster or federated servers.

It is a further object of the invention to extend the above approach so that an entire data center may be virtualized from backup images.

Another object of the invention is to provide a facility for resynchronizing a virtual machine created from a backup with the corresponding physical machine.

The virtualized servers provided by the invention may serve as an alternate data center standing in case of disaster or to meet maintenance windows achieving low cost Instant Disaster Recovery. A set of virtual machines may stand in for physical machines for a period of time and then resynchronized or re-seeded to physical machines via a combination of bare metal recovery and re-synchronizing from live LUNs that form the virtual machine disks.

In one embodiment, the ability to provide the facilities described above is provided, for one server, or any greater number of servers, as desired, by creating backup images in the configuration and image format that the virtualization software expects, and restarting these machines within the virtualization software. Since no data movement or traditional restore is involved, this is a near instantaneous process. The virtual machines are actually backed by read-write LUNs created by the backup software which works off the read-only backup image using additional space only for changed data. The underlying operating system software is also suitably modified so that a transition from physical to virtual hardware can be made.

An embodiment of the present invention is being made available as part of Backup Express® (BEX), a software product of Syncsort Incorporated, the assignee of the present application.

Other objects and advantages of the invention will be clear from the drawings and the detailed description which follows.

DETAILED DESCRIPTION

Figure 1:
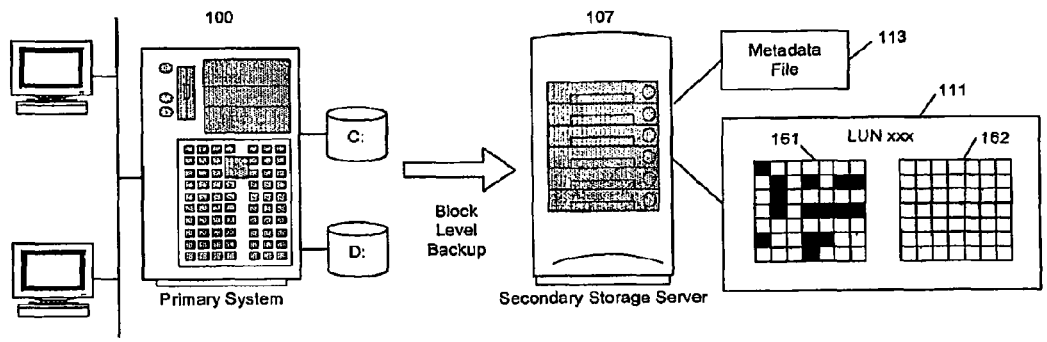
FIG. 1 is a block diagram schematically representing the creation of a backup image for use with the present invention.

The following is a description of several preferred embodiments of various aspects of the invention, showing details of how systems may be constructed to carry out the invention, and the steps that can be employed to utilize such systems and to practice such methods. These embodiments are illustrative only, and the invention is by no means limited to particular examples shown. For example, certain preferred embodiments are described in relation to an implementation with specific storage hardware, operating systems, and virtualization software, but it should be appreciated that the disclosure that follows was intended to enable those skilled in the art readily to apply the teachings set forth to other storage hardware, operating systems, and virtualization environments. The specific features of any particular embodiment should not be understood as limiting the scope of what may be claimed.

DEFINITIONS

The following terms have a defined meaning as used in this application:

Backup Software: Creates backup images capturing incremental changes and preserving points in time in the past on secondary storage. Backup software creates application consistent images and additionally captures machine configuration including persistent and volatile state.

Secondary Storage: Distinct from primary storage (which is where production data resides), this is the destination for backup as well as the data repository for LUNs that form virtual machine disks. Only changes require additional storage, thus little secondary storage beyond what is necessary for backup is needed. This secondary storage may be Write Once Read Many (WORM) to support un-alterable content retention to meet legal requirements.

Virtualization Hardware: A single machine or a set of machines running virtualization software and virtual machines on demand. The same hardware depending on configuration may also serve as the destination for backups and run the backup intelligence.

Virtualization Software: Virtualizes physical hardware, allowing many virtual machines to run on a given piece of hardware. Each virtual machine runs on virtual hardware. OSs are decoupled from physical hardware.

Volume: A unit of backup, a single file system comprising many files and directories that are backed up at the block level.

Backup Mechanism

Backup images are created by transferring allocated blocks for the first backup followed by changed blocks for subsequent backups. An application-consistent snapshot is created for a set of volumes, and the resulting data is moved in unison to secondary storage. After the first backup, only changes since the last backups are captured and applied to the existing secondary image. Along with data, machine configuration and state is transferred to secondary storage and is saved as meta-data for a given machine. A separate backup image exists for each source volume of the backed up machine. A snapshot taken of these images in conjunction with meta-data, saves this point-in-time state for future virtualization. The meta-data captured includes hard drive configuration including geometry, size, logical volume features etc., along with storage, and network controller details. The snapshot captures enough data and state to virtualize the entire machine on demand at some later time. Backup images created in this manner are saved in a format required by the specified virtualization server.

FIG. 1 illustrates this process. A primary system 100 is backed up to a read-write LUN 111 created by the backup software which works off the read-only backup image 161 using additional space 162 only for changed data. The meta-data captured as part of the process is stored in metadata file 113.

In certain situations the backup images may pre-exist or be externally created as LUNs on replicated volumes on SAN or NAS storage. In this situation the backup software needs to be run against these LUNs (or images) to generate meta-data and encapsulate machine state suitable for virtualization.

The backup storage could also be WORM (Write Once Read Many) to meet regulatory or hardening requirements.

Virtualization Steps

When desired by the user these backup images can "come to life" or be virtualized with the help of of-the-shelf virtualization software. Since the backup images for a machine were saved in a form required by the virtualization software, virtual machines may be restarted directly from the backup images to restore machine state to the point-in-time of the backup, usually the latest. The whole process is very quick since there is no data movement. The total time is entirely dominated by the time it takes the virtual machine to boot.

Figure 2:
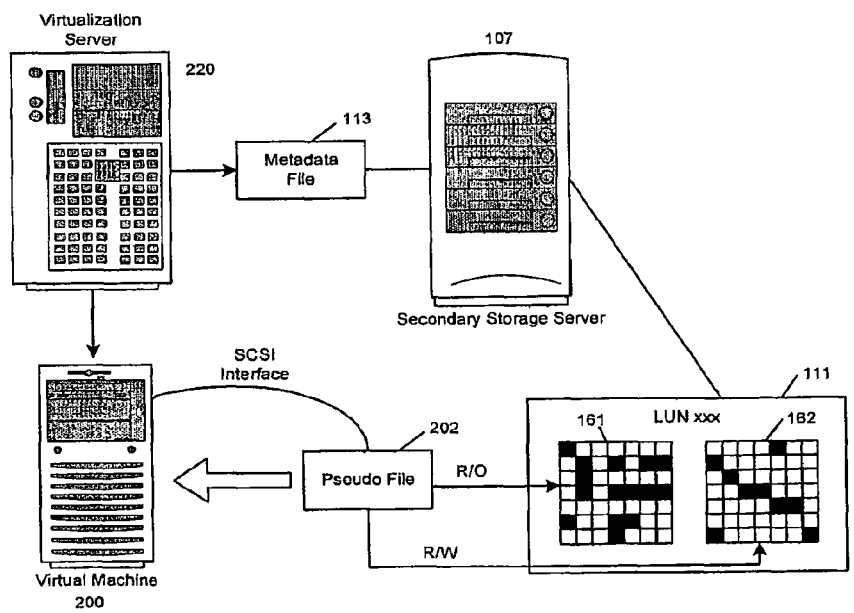
FIG. 2 is a block diagram schematically representing the use of a backup image resulting from the operations shown in FIG. 1, to launch a virtual machine under a virtualization server.

FIG. 2 and the description below show how this process works, in one embodiment:

1. The user selects a node (or a set of nodes) representing individual machines, clusters, or a set of machines constituting vital data center function from the latest snapshot or any other point in time. (For simplicity of illustration, FIG. 2 assumes that the selection made was fro a single node, in that case Primary System 100 of FIG. 1.) These machines could come up on their own private network if the need to virtualize is for verification or to fulfill other light-weight analytical functions, or they could come up on the public corporate network to take the place of failed machines. Default values for memory and number of CPUs are chosen automatically by the software depending on the amount of physical hardware available on the target hardware, or the user can tailor these values. The process of selection, virtualization and then satisfaction could be iterative, refined, remembered, and rehearsed. Templates from many runs could be saved and applied instantly when the need arises.

2. Once above the selection is done, a virtual machine configuration for virtual machine 200 is created that is appropriate for the virtualization software, which is then loaded in virtualization server 220. Directives for the number of CPUs, amount of memory, type of network and SCSI controllers and the number of hard drives is created as part of the configuration, based on the contents of metadata file 113.

3. Each backup image of a source volume is transformed into a LUN by creating a pseudo-file 202 which presents an envelope on top of the backup image 111. This LUN is seen by the virtual machine as a normal read/write SCSI hard drive. Writes to the LUN do not affect the integrity of the backup image 161 but are persisted separately 162 (especially if the secondary storage is WORM then writes are not possible for both technical and business reasons). These LUNs survive reboot and retain all writes that are made to it.

Depending on whether the source machine was standalone or a cluster, LUNs are created differently. For stand-alone machines single partition LUNs are created out of each volume, regardless of how many physical hard drives existed on the source. Logical volume manager controlled volumes are stripped of that quality. (Performance and/or reliability criteria for virtual disks are achieved through qualities of the underlying storage on the virtualization box.) In case of clusters the exact number of shared hard drives is re-created as a set of multi-partition LUNs so that clustering software may function.

The important thing to note is that no additional storage is needed to accomplish this. Only newly created and/or changed data needs new storage (162). (This is typically 5% of the original storage.) Not only is no additional hardware required to virtualize many machines, little additional storage is required to accomplish this. (Typical over capacity available on secondary storage is usually sufficient)

Note: Many virtual machines may be created from the same set of backup images each with their own independent life cycles, still leaving the original images unaltered.

4. In order that these virtual machines may boot, the boot and system drives are impregnated with boot records appropriate for the Operating System, and partition table jumps created, and the boot sector of the file system fixed if needed. This enables the virtual machine BIOS to transfer control to the boot strap code on the LUN so that the operating system on the backed up machine can be launched, which in turn brings up databases, line of business applications etc. (This step is specific to the operating system image being virtualized.)

5. The system drive of the target VM is then made visible to the virtualization box and a process called OSfixer runs, which modifies files and/or configuration on the system drive so that the previous step of booting into virtual hardware may succeed. This involves OS specific steps depending on both the source and the target to repurpose the system drive for virtual machine booting.

6. The virtual machine or machines are then launched to complete the process. These machines may appear on the public network or on a segregated network depending on why these machines are being brought up. What happens next depends on the business function that needs to be fulfilled and is described below.

Business Applicability

A. Stand-in for site disasters or virus attacks and other rolling corruption: A critical set of machines (including clusters) may be virtualized from backup images for business continuity reasons on a temporary basis on scaled down hardware at an alternate site using almost no additional storage other than what was allocated to disk backup, at a shared facility, in a mobile data center or even in some technology savvy basement. In case of virus attacks or rolling corruption the point-in-time chosen is not necessarily the latest but before the attack or corruption. Various machines may be rolled back to various points in time in the case there is rolling or creeping corruption. The down time from an outage could be as low as minutes.

B. Regulatory Compliance: Compliance is facilitated by the fact that machines, and/or set of machines may be virtualized with minimum hardware cost from regulatory significant points in time from the past. Not only would all data be available but entire machines with relevant applications could be resurrected in their entirety, representing the ultimate in good faith in part of business in the face of audits. Legal discovery, compliance, and/or the auditing process would be reduced from long months to days, even hours.

C. DR Drill/Backup Verification: Most backups these days go un-verified because of expense and time constraints. DR drills are also costly and excruciating. Backup virtualization makes this simple, effective, extremely quick, and a business must have. This can be used as a routine business practice, as a more effective protector of business data and configuration.

D. Near-lining legacy application together with legacy data for posterity: Typically backups protect only data, but Backup Virtualization protects both data and configuration which may be recreated in a virtual machine and understood by the legacy application long after the company which created the application is out of business or stopped support. (Backup Virtualization can also be realized from tape if backups have expired—although this requires restore from tape to disk.)

E: Data Warehousing and General Purpose What-if: When line-of-business applications based on databases need to export data that are used for seasonal forecasting, analysis, reporting, testing etc., an enormous amount of additional storage and administrative overhead is incurred (not to mention lost creativity while highly paid analysts wait). Backup Virtualization not only makes the data available but the machine and the hosting database can be recreated from the desired point in time (as analytically appropriate) at the fraction of the hardware and storage cost and almost near instantaneously. The cost savings for business are enormous.

F. Migration from physical to virtual machines: Once physical machines are virtualized from backup images these might become permanent, thus allowing migration from legacy hardware.

G. Cloning or Many Machines from One: Since many virtual machines may be created from a single set of images from a given point-in-time, this allows easy cloning of a "good" configuration as well as many users using many virtual machines each sharing the same set of images and using storage only for actual changes that are made on individual virtual machines.

Post Virtualization

Depending on why backup virtualization was employed there are essentially three scenarios.

1. The need is short term: In this case after "Backup to Virtual" (B2V) has served it business purpose, it can be torn down and forgotten, freeing up resources and storage space. The set of backup images (till they expire) remain available in their pristine form for further virtualization if the need arises.

2. The need is longer term: The Virtual Machines may prove useful and need more muscle. This may be accomplished by freeing the underlying LUNs from their backup snapshots and then moving them and/or giving them more virtual hardware. This is affected by copying all blocks in the background from the backup image on to the LUN. The other option is to seed a physical machine from the same point-in time backup image via bare-metal restore and then synchronizing it with the live virtual machine, with minimum downtime.

3. The need is short term but end of life synchronization is needed: When Backup Virtualization is used to stand in for failed machines or during scheduled maintenance, resynchronization at some future point in time is necessary. This is because the virtual machines have been live during this period and data has diverged from the point-in-time of the backup image. The new state and data that now exists within the virtual machine needs to de resynchronized after the original failed machines have been restored via bare-metal restore, or scheduled maintenance completes. The re-synchronization process minimizes application downtime by keeping the virtual machines running till they are ready to be switched over. How this is accomplished is described below.

How virtual machines converge with the real: The LUNs that underlie the virtual hard disks of the virtual machines keep track of writes that happen through the virtual machine and store them separate from the backup image. Situations where the changing data on the LUNs might need to re-synchronized at a later time (indicated by the user), require that these LUNs are check pointed at frequent intervals. This involves saving all changes in an interval to a tagged file when the checkpoint happens and then switching to a new checkpoint file. Each LUN for each volume has a series of checkpoint files containing changes between checkpoints. The re-synchronization process starts at the end of the bare-metal process or is user initiated and copies data from these check point files on top of existing or restored data for the volume.

If the OSFixer has altered the system drive to make it bootable under virtual hardware this specific checkpoint file is ignored for resynchronization. In situations where the target hardware is different from the source hardware an additional OSFixer step is required to make the image conform to the target hardware. Once all the checkpoint files are copied the virtual machine is stopped and the final checkpoint file is applied. The real machine then takes over. The virtual machine may then be recycled, reclaiming resources.

It is evident that the embodiments described herein accomplish the stated objects of the invention. While the presently preferred embodiments have been described in detail, it will be apparent to those skilled in the art that the principles of the invention are realizable by other devices, systems and methods without departing from the scope and spirit of the invention, as be defined in the following claims.

We claim:

1. A method for virtualizing a physical machine from a backup image of said physical machine, comprising:
   a) creating a backup image of said physical machine in a format for a virtual machine image for a virtualization server, further comprising saving together therewith, supplemental to said image, machine configuration information of said physical machine, said machine configuration information comprising persistent and volatile state, wherein creating said backup image of said physical machine comprises:
      taking a base-level snapshot of said physical machine, said snapshot comprising an application-consistent image as of a specific point in time of primary storage where the production data of said physical machine resides;
      taking block-level incremental snapshots of said physical machine, where the incremental snapshots represent only the blocks that have been changed since the prior snapshot; and
      constructing the incremental snapshots in a manner that can be used directly as a mounted storage unit;
   b) loading said backup image as a virtual machine image under said virtualization server;
   c) running said virtual machine and processing new input therewith;
   d) restarting said physical machine at a time subsequent to said backup; and thereafter
   e) synchronizing existing data on said physical machine with the data on said virtual machine subsequent to the processing new input.

2. The method of claim 1, wherein said backup image is a snapshot of said physical machine, comprising an application-consistent image as of a specific point-in-time of primary storage where the production data of said physical machine resides.

3. The method of claim 1, wherein the step of creating said backup image of said physical machine further comprises:
   storing the snapshot image on a storage device; and
   saving said machine configuration information at the point-in-time of each snapshot image, with the snapshot image.

4. A method for virtualizing a plurality of physical machines comprising:
   a) creating a backup image of each said physical machine in a format for a virtual machine image for a virtualization server, further comprising saving together with each said backup image, supplemental to said image, machine configuration information of the corresponding physical machine, said machine configuration information comprising persistent and volatile state, wherein creating said backup image of each said physical machine comprises:
      taking a base-level snapshot of said physical machine, said snapshot comprising an application-consistent image as of a specific point in time of primary storage where the production data of said physical machine resides;
      taking block-level incremental snapshots of said physical machine, where the incremental snapshots represent only the blocks that have been changed since the prior snapshot; and
      constructing the incremental snapshots in a manner that can be used directly as a mounted storage unit;
   b) loading said backup images as a plurality of virtual machine images under said virtualization server;
   c) running said plurality of virtual machines and processing new input therewith;
   d) restarting said physical machines at a time subsequent to said backup; and thereafter
   e) synchronizing existing data on said physical machines with the data on said virtual machines subsequent to the processing new input.

\* \* \* \* \*